(12) United States Patent
Park

(10) Patent No.: US 7,848,620 B2
(45) Date of Patent: Dec. 7, 2010

(54) METHOD FOR MANAGING CHAPTERS

(75) Inventor: Kyung Yun Park, Osan-si (KR)

(73) Assignee: LG Electronics Inc., Seoul (KR)

( * ) Notice: Subject to any disclaimer, the term of this patent is extended or adjusted under 35 U.S.C. 154(b) by 1387 days.

(21) Appl. No.: 11/305,331

(22) Filed: Dec. 19, 2005

(65) Prior Publication Data

US 2006/0159416 A1 Jul. 20, 2006

(30) Foreign Application Priority Data

Dec. 20, 2004 (KR) .................. 10-2004-0108514

(51) Int. Cl.
*H04N 5/00* (2006.01)
(52) U.S. Cl. .................. 386/125; 386/52; 360/13
(58) Field of Classification Search ........... 386/52, 386/125; 360/13
See application file for complete search history.

(56) References Cited

U.S. PATENT DOCUMENTS

| 7,376,336 B2* | 5/2008 | Nakamura | 386/92 |
| 2002/0059349 A1* | 5/2002 | Wakita et al. | 707/517 |
| 2004/0264947 A1* | 12/2004 | Okada et al. | 386/125 |
| 2005/0100308 A1* | 5/2005 | Moteki | 386/4 |

* cited by examiner

*Primary Examiner*—Thai Tran
*Assistant Examiner*—Girumsew Wendmagegn
(74) *Attorney, Agent, or Firm*—KED & Associates, LLP

(57) ABSTRACT

A method for managing chapters is disclosed. When data such as broadcasting program are recorded and chapters are set (e.g., automatically) based on a predetermined time interval in a disc recorder, such as a DVD recorder, embodiments of a method and apparatus of the invention can selectively integrate the last chapter of the recorded program with a chapter prior to the last chapter. The method can efficiently set the number of chapters without deteriorating random access performance. The method can efficiently manage navigation information according to chapter separation.

19 Claims, 6 Drawing Sheets

FIG. 4

M_C_GI (Movie Cell General Information)

| RBP | Filed Name | Contents | Byte |
|---|---|---|---|
| 0 | Reserved | Reserved | 1 |
| 1 | C_TY | Cell Type | 1 |
| 2 ~ 3 | M_VOBI_SRPN | M_VOBI Search Pointer Number | 2 |
| 4 ~ 5 | C_EPI_Ns | Number of C_EPIs | 2 |
| 6 ~ 11 | C_V_S_PTM | Video Start PTM of this Cell | 6 |
| 12 ~ 17 | C_V_E_PTM | Video End PTM of this Cell | 6 |
| Total | | | 18 |

FIG. 5

M_C_EPI (Movie Cell Entry Point Information)

| RBP | Filed Name | Contents | Byte |
|---|---|---|---|
| 0 | EP_TY | Entry Point Type | 1 |
| 1 ~ 6 | EP_PTM | PTM of Entry Point | 6 |
| 7 ~ 8 | PRM_TEXTI | Primary Text Information for this EP | 2 |
| Total | | | 8 |

US 7,848,620 B2

METHOD FOR MANAGING CHAPTERS

BACKGROUND OF THE INVENTION

1. Field of the Invention

The present invention relates to a method for managing chapters set within a recording program.

2. Background of the Related Art

Disc recorders, for example, a DVD recorder, are commonly used to record and play high quality video data and high quality audio data for a relatively long time. In such a DVD recorder externally inputted audio and video signals are encoded to audio and video data, for example, AC3 audio data and MPEG-2 video data, to comply with a DVD format. The encoded audio and video data are recorded in a data area of a disc based on program units, and navigation information for controlling program playback is generated and recorded in a lead-in area of the disc, etc. to be managed.

However, as described above, the related art DVD recorder and methods have various disadvantages. For example, recording management information like navigation information improperly can cause errors in managing the recorded program.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the invention is to provide a method and apparatus for managing chapters when recording on an optical disc that can solve at least the above problems and/or disadvantages and to provide at least the advantages described hereinafter.

Another object of the invention is to provide a method and apparatus for managing chapters that can manage chapters set when data, such as broadcasting programs, are recorded and cell information recorded therein corresponding to the chapters.

Another object of the invention to provide a method for managing chapters that can update chapters previously set in a plurality of previously recorded programs and cell information corresponding to the updated chapters.

In accordance with an aspect of the invention, at least the above and other objects can be accomplished in a whole or in part by a method for managing chapters that includes setting chapters based on a predetermined time interval when recording audio or video data for a program, comparing a time interval of a last chapter with a second time interval that is based on the predetermined time interval and merging a penultimate chapter with the last chapter when the last chapter is shorter than the second time interval.

In accordance with another aspect of the invention, there is provided a method for managing chapters that includes searching last chapters set for each of a plurality of programs and updating a chapter prior to each of the searched last chapters as a last chapter of a corresponding program when a time interval of each of the searched last chapters is shorter than a corresponding predetermined time interval.

In accordance with another aspect of the invention, there is provided an apparatus for managing chapters for a content recorded on a recording medium that includes a navigation generator configured to determine a plurality of chapters for a program based on a predetermined time interval and a control unit configured to combine a penultimate chapter with the last chapter when the last chapter is shorter than a second time interval that is based on the predetermined time interval.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 2 to FIG. 5 are diagrams illustrating exemplary navigation information defined in the DVD VR standard according to embodiments of the invention;

DETAILED DESCRIPTION OF PREFERRED EMBODIMENTS

When a DVD recorder records a program in a state where data is not recorded in a disc inserted therein, a "VMG table" of navigation information defined in a "DVD video" standard is created and recorded if the disc types are a DVD-R, DVD+R, and DVD+RW. Also, if the disc is a DVD-RAM, a "RTR_VMG Table" of navigation information defined in the "DVD VR" standard is created. In addition, if the disc is a DVD-RW, navigation information adapted to a recording format selected by a user is created.

On the other hand, if the disc has recorded data therein, the DVD recorder refers to navigation information recorded in the disc to create navigation information for newly recorded programs in a format corresponding to the referred navigation information. The newly created navigation information is stored therein.

The DVD recorder automatically sets a plurality of chapters for performing a random access to a position within a recorded program at a user's request, based on a predetermined set time interval, and creates navigation information corresponding to the chapters to be recorded. For example, if the entire recording time for the program is 97 minutes and a preset time interval is 3 minutes, the DVD recorder automatically sets 32 chapters (Chapter #1~#32) that are 3 minutes in length and one chapter (Chapter #33) that is one minute in length, and creates 33 cell information (CI) as navigation information corresponding to the automatically set 33 chapters to be recorded.

When a user requests the chapter list, the DVD recorder searches for the navigation information, creates OSD images such that the user can select and designate a chapter, for example, thumbnail pictures corresponding to each chapter. Such OSD images of a chapter list can include menu items, for example, so that a chapter is played or deleted. The OSD images are then output to the external devices, such as a TV.

According to the automatic chapter setting operation, when the plurality of chapters are set, based on predetermined time intervals, cell information is created for each of the automatically set chapters. However, when data is recorded in the DVD-RW in a DVD video mode, the maximum number of cell information recordable in a single disc is limited to 254, and the maximum number of chapters set in a single program is also limited to 99, according to the DVD standard. Therefore, if the number of automatically set chapter numbers is greater than 99 or the number of cell information created as the chapters are automatically set is greater than 254, navigation information cannot be normally managed.

Thus, when data is recorded in a video mode, there is a total limit for chapters in a single program and cell information for the recordable disc. When such limits are exceeded, recording management information like navigation information can cause errors in managing the recorded program.

Figure 1:
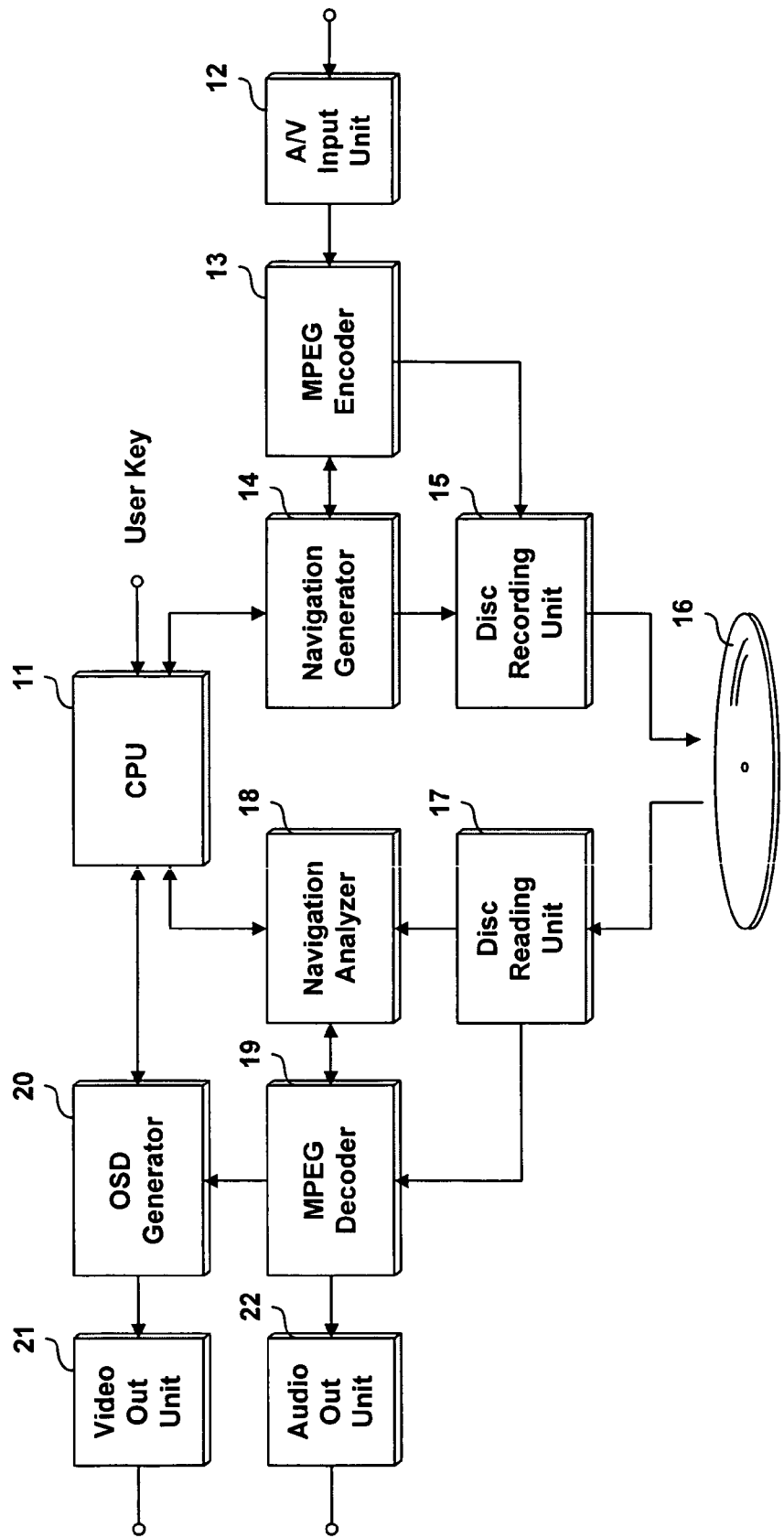
FIG. 1 is a schematic block diagram illustrating an embodiment of a DVD recorder according to the invention.

FIG. 1 shows an embodiment of a DVD recorder that can include a microcomputer 11, an audio and video input unit 12, an MPEG encoder 13, a navigation generator 14, a disc recording unit 15 and a disc 16. The DVD recorder can further include a disc reading unit 17, a navigation analyzer 18, an MPEG decoder 19, an OSD generator 20, a video output unit 21 and an audio output unit 22, etc.

For example, when audio and video data is recorded in a DVD-RW in a DVD video mode, the DVD recorder manages successively recorded data using a program. In this case, the program can include a plurality of video object units (VOBUs), and the navigation generator 14 searches for, in real time, position of the disc in which the VOBUs are recorded, and creates "RTR_VMG Table" as navigation information, for example, as shown in FIG. 2.

Figure 2:
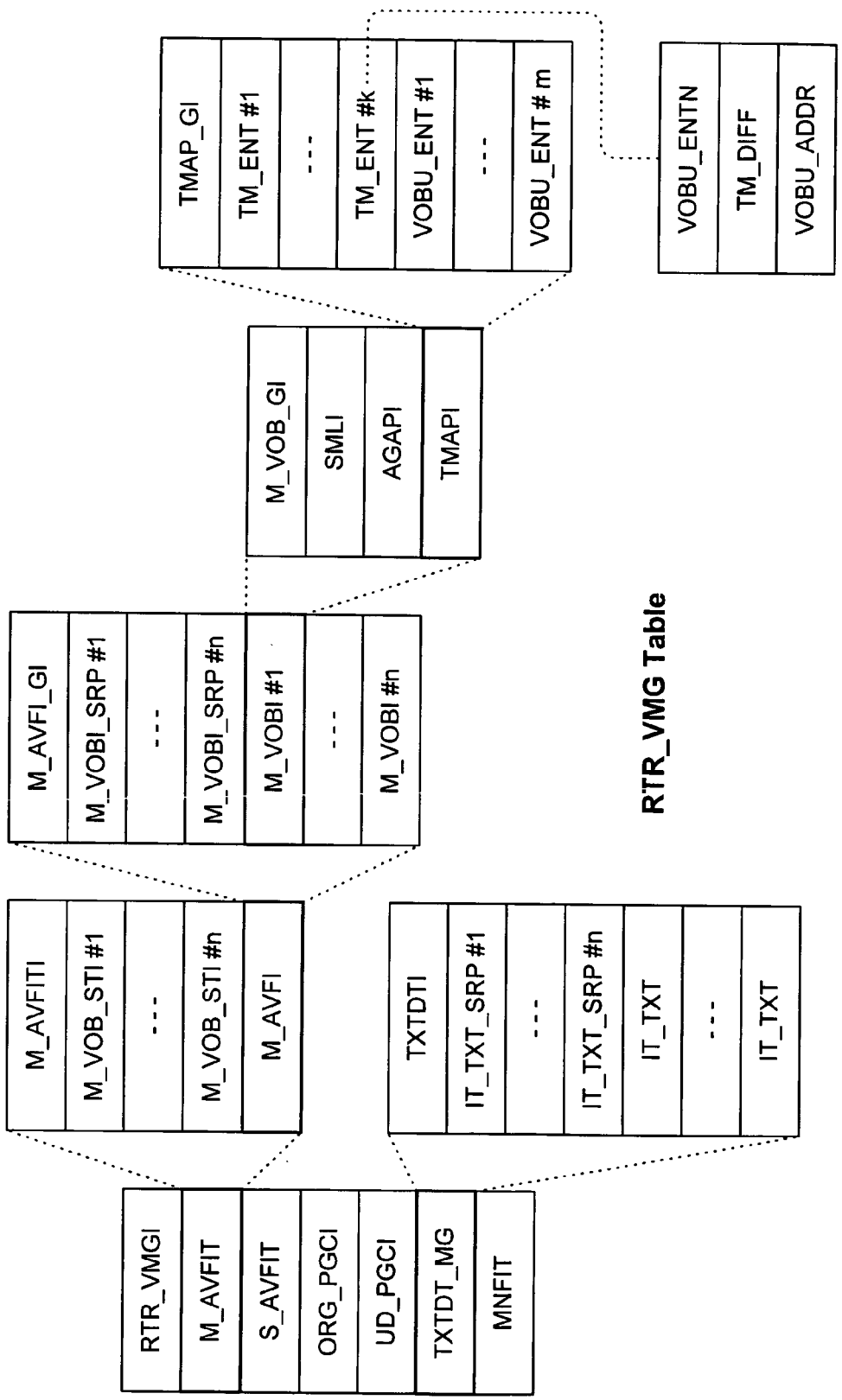

As shown in FIG. 2, VOBU entry number information VOBU_ENTN, time difference information TM_DIFF, and object VOBU address information VOBU_ADDR can be managed in the TM_ENT recorded in the RTR_VMG Table. The object VOBU address information VOBU_ADDR can designate VOBU addresses in the disc in which data of the VOBU entry number BOBU_ENTN are recorded. The navigation generator 14 can create TM_ENT every time VOBU is added thereto according to a data recording operation, and manage addresses of newly recorded VOBU.

Figure 3:
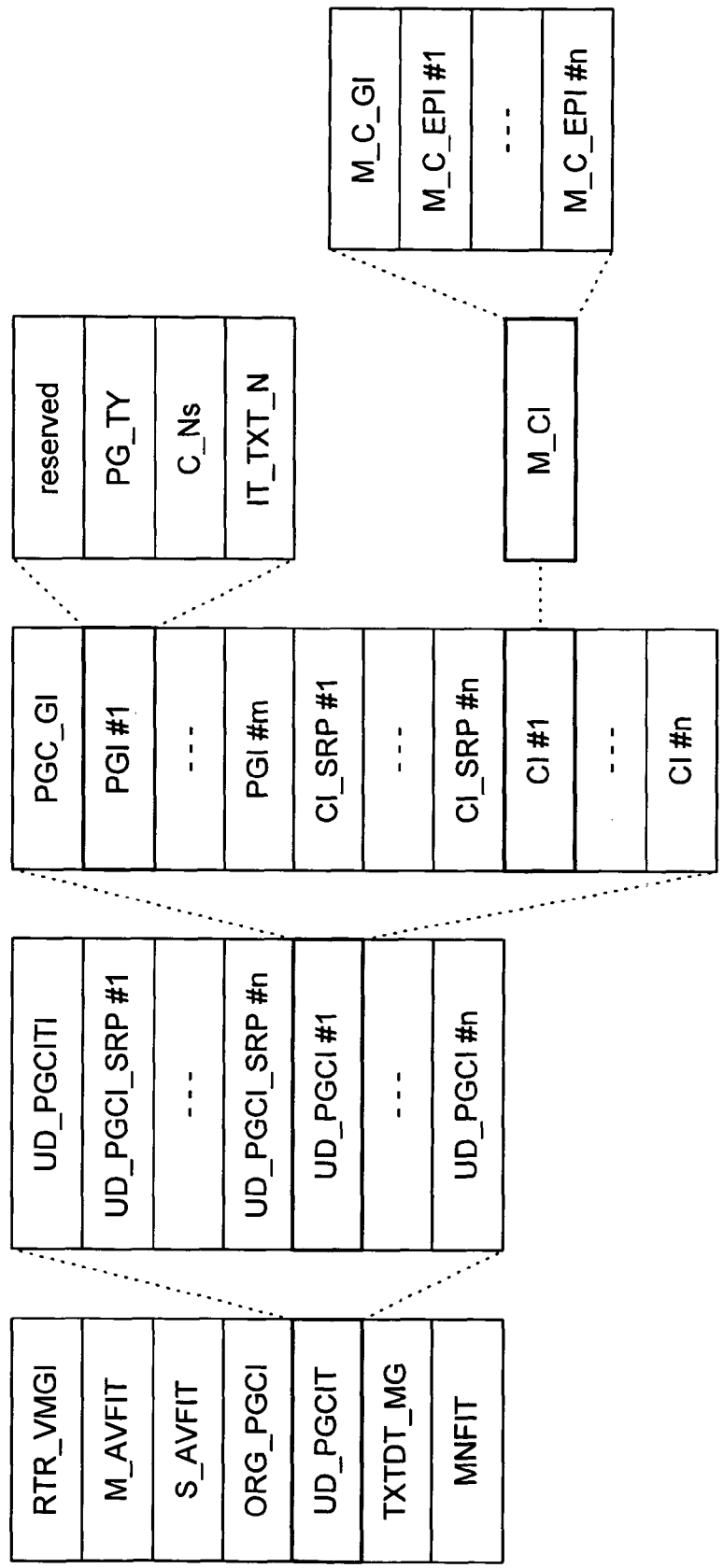

Also, navigation information for controlling playback of the program, can be managed, for example, in an exemplary program change information (PGCI) Table as shown in FIG. 3. A user defined PGCI (UD_PGCI) Table can include program information e.g., (PGI) and cell information e.g., (CI), and the program information can include program type (PG_TY) and cell information number (C_Ns), and index text number information (IT_TXT_N). Also, the cell information, for example movie cell information e.g., (M_CI, can include movie cell general information (M_C_GI) and a plurality of movie cell entry point (M_C_EPI#1~#n).

Such movie cell general information, for example, as show in FIG. 4 (e.g., movie cell general information M_C_GI, can include a cell type (C_TY, movie VOB information search point number (M_VOBI_SRPN), a cell entry information number (C_EPI_Ns), video start time of a corresponding cell (C_V_S_PTM) and video end time of a corresponding cell (C_V_E_PTM). Also, the movie cell entry point information, for example as shown in FIG. 5 (e.g., movie cell entry point information M_C_EPI can include an entry point type (EP_T, an entry point time (EP_PTM) and primary text information (PRM_TEXTI) for a corresponding entry point.

Figure 6:
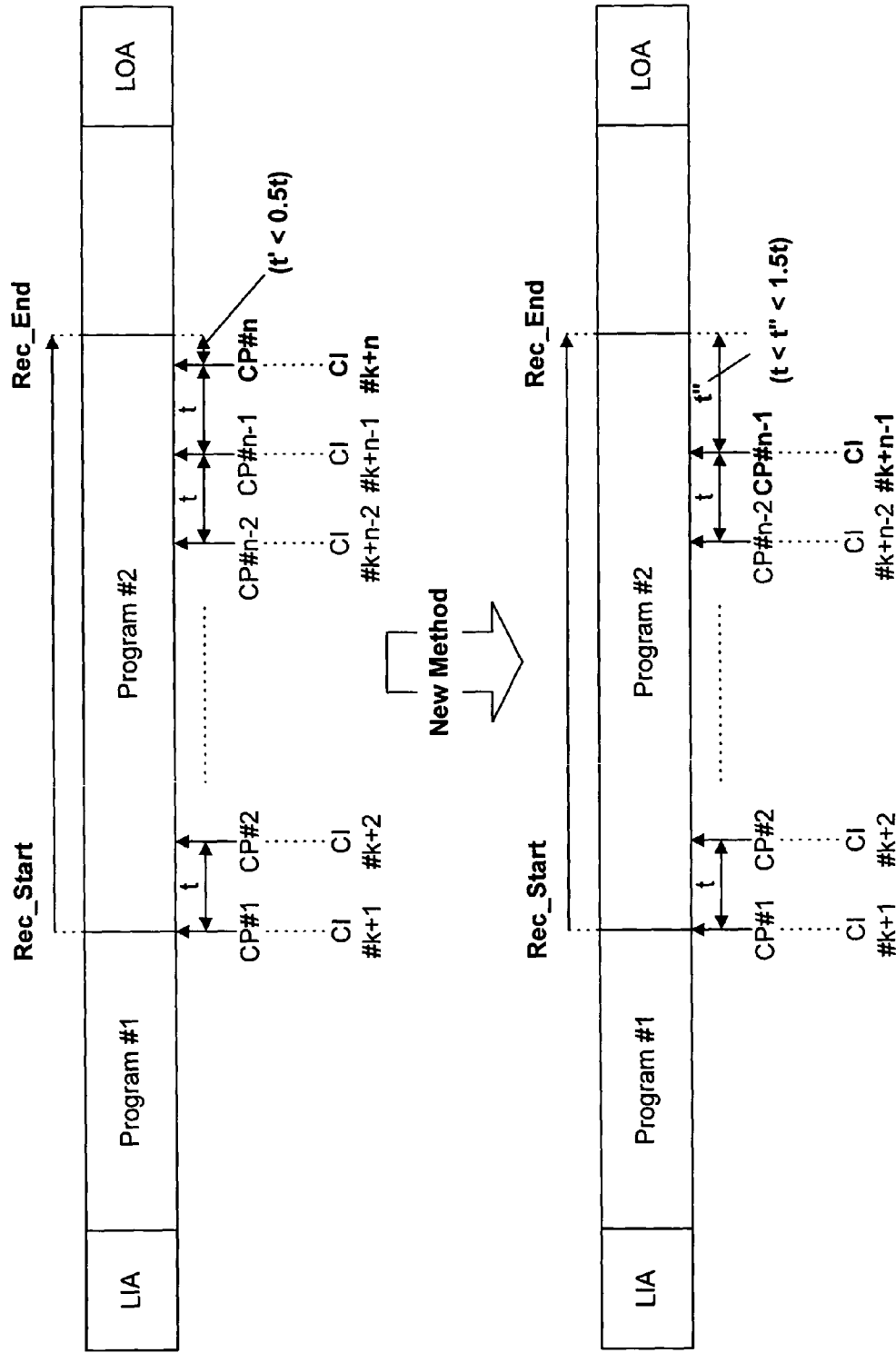
FIG. 6 is a diagram that shows a method for managing chapters according to a first embodiment of the invention.

FIG. 6 is a diagram that shows an embodiment of a method for managing chapters according to the invention. As shown in FIG. 6, the embodiment of a method for managing chapters can be applied to and will be described using embodiment of the DVD recorder shown in FIG. 2. However, the invention is not intended to be so limited.

As shown in FIG. 6, when the DVD recorder records externally inputted audio and video in a disc, the audio and video input unit 12 can convert analog audio and video signals into digital audio and video data, and the MPEG encoder 13 can encode the digital audio and video data into DVD-format compliant audio and video data. For example, DVD-format compliant data can include AC3 audio data and MPEG2 video data.

The disc recording unit 15 can record the encoded audio and video data in a data area of a disc. For example, when the first program (e.g., Program #1) is recorded in the disc, newly recorded audio and video data (e.g., Program #2) can be recorded as the second program.

The microcomputer 11 can automatically set chapters based on a time interval, if a current operation mode is an automatic chapter set mode. For example, as shown in FIG. 6, since a method for automatically setting chapters divides the second program (e.g., Program #2) based on a predetermined time interval (for example, t=60 sec), to allocate them to each of the chapters (CP#1~#n), the last chapter (CP#n) is set as one chapter, although the time interval of the last chapter (CP#n) (for example, t'=20 sec) can be shorter than the predetermined time interval. Also, the navigation generator 14 can create n cell information (e.g., CI#k+1~#k+n) corresponding to the set n chapters and records them therein.

On the other hand, the method shown in FIG. 6 for managing chapters according to the invention can divide the second program (Program #2) based on a predetermined time interval (for example, t=60 sec) to allocate them to each of chapters (CP#1~#n), in which a time interval of a last chapter (CP#n) to be set can be compared with the second time interval, for example, ⅓, ½ or ⅔ of the predetermined time interval.

When a time interval of a last chapter (CP#n) to be set is greater than the second time interval, the last chapter (e.g., CP#n) to be set is preferably set, without modification such that n chapters and n cell information (CI#k+1~#k+n) corresponding to the n chapters can be created.

On the contrary, when the time interval of the last chapter (CP#n) to be set (for example, t'=20 sec) is shorter than the second time interval, for example, half the predetermined time interval, the chapter (e.g., CP#n) to be set is preferably not set and instead the previous chapter (e.g., CP#n−1) can be set as the last chapter. The navigation generator 14 can create n−1 cell information (e.g., CI#k+1~#k+n−1) corresponding to n−1 chapters (CP#1~#n−1) and record the cell information therein.

n−1 cell information (CI#k+1~#k+n−1) corresponding to the n−1 chapters (CP#1~#n−1), as shown in FIG. 3, can be recorded based on movie cell information (M_CI), in which each movie cell information, as shown in FIG. 4, can include cell type (for example, C_TY=000b) indicative of movie cell information.

Also, the movie cell information can record video start time information (e.g., C_V_S_PTM) of a corresponding cell and video end time information (e.g., C_V_E_PTM) of a corresponding cell therein. Of the n−1 cell information, a time interval between cell video start time information (C_V_S_PTM) and cell video end time (C_V_E_PTM), which are recorded in the first cell to the n−2-th cell information (CI #k+1~#k+n−2) can be a predetermined time interval (for example, t=60 sec). On the other hand, a time interval between cell video start time information (C_V_S_PTM) and cell video end time (C_V_E_PTM), which are recorded in the remaining n−1-th cell information (CI #k+n−1) can become a relatively longer time interval (for example, t"=80 sec) than the predetermined time interval.

The second program information (PGI#2) corresponding to the second program (Program #2), as shown in FIG. 3, can record cell information number (CI_Ns) therein. In this case, the navigation generator 14 can record n−1 cell information number therein.

Figure 7:
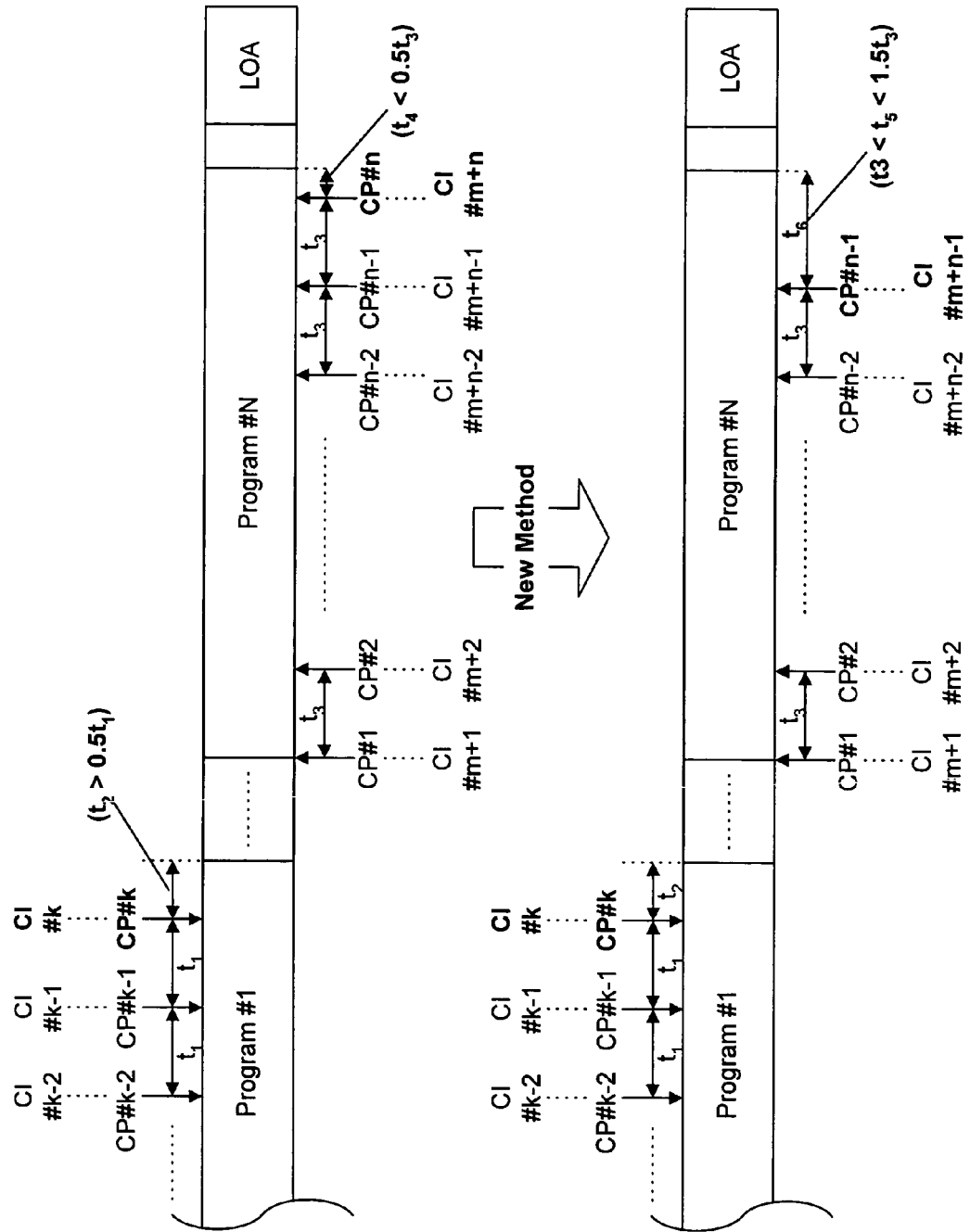
FIG. 7 is a diagram that shows a method for managing chapters according to a second embodiment of the invention.

FIG. 7 is a view describing a method for managing chapters according to another embodiment of the invention. As shown in FIG. 7, the embodiment of a method for managing chapters can be applied to and will be described using embodiment of the DVD recorder shown in FIG. 2. However, the invention is not intended to be so limited.

For example, if the number of chapters, which is set in a program, is more than a predetermined number requested by a user, or if the number of cell information, which is set in a hard disk, is more than a predetermined number, the microcomputer 11 of the DVD recorder can adopt methods of embodiments of the invention for updating the last chapter for each of the programs. However, the invention is not intended to be so limited.

For example, as shown in FIG. 7, k chapters (CP#1~CP#k) and k cell information (CI#1~CI#k) can be set regarding the first program (Program #1), and n chapters (CP#1~CP#n) and n cell information (CI#m+1~CI#m+n) can be set regarding the N-th program (Program #N). Under this state, if an update operation for the last chapters is performed, the microcomputer 11 can control operations of the navigation analyzer 18 such that cell information corresponding to the last chapter of each program can be read.

The microcomputer 11 can refer to a video start time (C_V_S_PTM) and a video end time (C_V_E_TPM) of the k-th cell information (CI #k) corresponding to the last chapter (CP#k) for the first program, and check a time interval (for example, t2=40 sec) of the last chapter (CP#k) (or cell). Also, the microcomputer 11 can refer to a video start time and a video end time of the k−1-th cell information (CI#k−1) corresponding to the k−1-th chapter (CP#k−1) and check a time interval (for example, t1=60 sec) of the remaining chapters (or cells). After that, the microcomputer can compare the time interval (for example, t2=40 sec) of the last chapter with ½(e.g., 30 sec) of a time interval of the remaining chapters (e.g., 60 sec).

As shown in FIG. 7, since the time interval (40 sec) of the k-th chapter is longer than ½(30 sec) of the time interval of the remaining chapters, the k-th chapter can be maintained as the last chapter. Preferably, the cell information number (C_Ns) recorded in program (PGI#1) corresponding to the first program is not updated and is instead maintained as k. Further, the k-th cell information (CI#k) is maintained, such that the time interval of the k-th cell is maintained as 40 sec.

Also, the microcomputer 11 can refer to a video start time (C_V_S_PTM) and a video end time (C_V_E_TPM) of the n-th cell information (CI #m+n) corresponding to the last chapter (CP#n) for the N-th program, and check a time interval (for example, t4=20 sec) corresponding thereto. Also the microcomputer 11 can refer to a video start time and a video end time of the m+n−1-th cell information (CI#m+n−1) corresponding to the n−1th chapter (CP#n−1) and check a time interval (for example, t3=50 sec) of the remaining chapters (or cell). After that, the microcomputer can compare the time interval (t4=20 sec) of the last chapter with ½(25 sec) of a time interval of the remaining chapters.

As shown in FIG. 7, since the time interval (20 sec) of the n-th chapter is shorter than ½(25 sec) of the time interval of the remaining chapters, the microcomputer 11 can delete the n-th chapter, and set the n−1-th chapter as the last chapter.

The navigation generator 14 can reduce cell information number (C_Ns) recorded in program information (PGI#N) corresponding to the N-th program, and updates a video start time (C_V_S_PTM) and a video end time (C_V_E_PTM) of the n−1-th cell information (CI#m+m−1), thereby increasing a time interval (for example, t6=70 sec) of a corresponding cell.

Embodiments of methods and apparatus for managing chapters can be applied to various disc recorders, such as a DVD recorder, etc. However the invention is not intended to be so limited.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of a method and apparatus for managing chapter information of a recorded program have various advantages. For example, when data such as a broadcasting program are recorded while chapters are set (e.g., automatically) based on a predetermined time interval, embodiments of a method can set the number of chapters without deteriorating random access performance, and manage navigation information according to chapter separation.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for managing chapters for a content on a recording medium, comprising:
    setting chapters based on a predetermined time interval when recording audio data or video data for a program;
    comparing a time interval of a last chapter with a second time interval that is based on the predetermined time interval; and
    merging a penultimate chapter with the last chapter when the time interval of the last chapter is shorter than the second time interval.

2. The method of claim 1, wherein said merging is performed when a number of the chapters in the program is greater than a predetermined number.

3. The method of claim 1, wherein said merging is performed when cell information, which is created to correspond to chapters set in the recording medium, is more than a predetermined number.

4. The method of claim 1, further comprising:
    creating cell information for each of the chapters, as navigation information.

5. The method of claim 4, wherein cell information corresponding to the merged last chapter of the cell information records video start time information and video end time information for a time interval different from each of the previous chapters cell information.

6. The method of claim 1, further comprising setting the last chapter separate from the penultimate chapter when the time interval of the last chapter is not shorter than the second time interval.

7. The method of claim 1, wherein the comparing comprises comparing a time interval of a last chapter to be created, and wherein the last chapter is not created.

8. The method of claim 1, wherein the second time interval is equal to or less than the predetermined time interval.

9. The method of claim 8, wherein the second time interval is half of the predetermined time interval, one third of the predetermined time interval or one quarter of the predetermined time interval.

10. A method for managing chapters for a content on a recording medium, the method comprising: searching last chapters set for each of a plurality of programs; updating a chapter prior to each of the searched last chapters as a last chapter of a corresponding program when a time interval of each of the searched last chapters is shorter than a corresponding predetermined time interval; and merging a penultimate chapter with the last chapter when the time interval of the last chapter is shorter than the second time interval.

11. The method of claim 10, wherein the corresponding predetermined time interval is set based on time intervals of the remaining chapters of the corresponding program.

12. The method of claim 10, wherein the updating is performed when a number of chapters set in the same program is greater than a predetermined number.

13. The method of claim 10, wherein the updating is preformed when cell information, which is created to correspond to chapters set in the recording medium, is more than a predetermined number.

14. The method of claim 10, further comprising:
performing an update such that cell information as navigation information corresponds to the updated chapter.

15. The method of claim 14, wherein the performing comprises:
deleting cell information corresponding to the last chapter whose time interval is shorter than the corresponding predetermined time interval; and
updating cell number information in a program information (PGI) for managing the deleted cell information.

16. The method of claim 14, wherein the updated cell information records video start time information and video end time information that have time intervals different from those of remaining cell information of the corresponding program.

17. The method of claim 10, wherein the corresponding predetermined time interval is equal to or less than the time intervals of the remaining chapters.

18. The method of claim 17, wherein the corresponding predetermined time interval is a half, $2/3$ or $3/4$ of the time intervals of the remaining chapters.

19. An apparatus for managing chapters for a content on a recording medium, the apparatus comprising:
a navigation generator configured to determine a plurality of chapters for a program based on a predetermined time interval; and
a control unit configured to combine a penultimate chapter with a last chapter when a time interval of the last chapter is shorter than a second time interval that is based on the predetermined time interval.

* * * * *